Aug. 11, 1964
E. BITTNER
3,143,812
INSOLES FOR FOOTWEAR
Filed Sept. 22, 1961
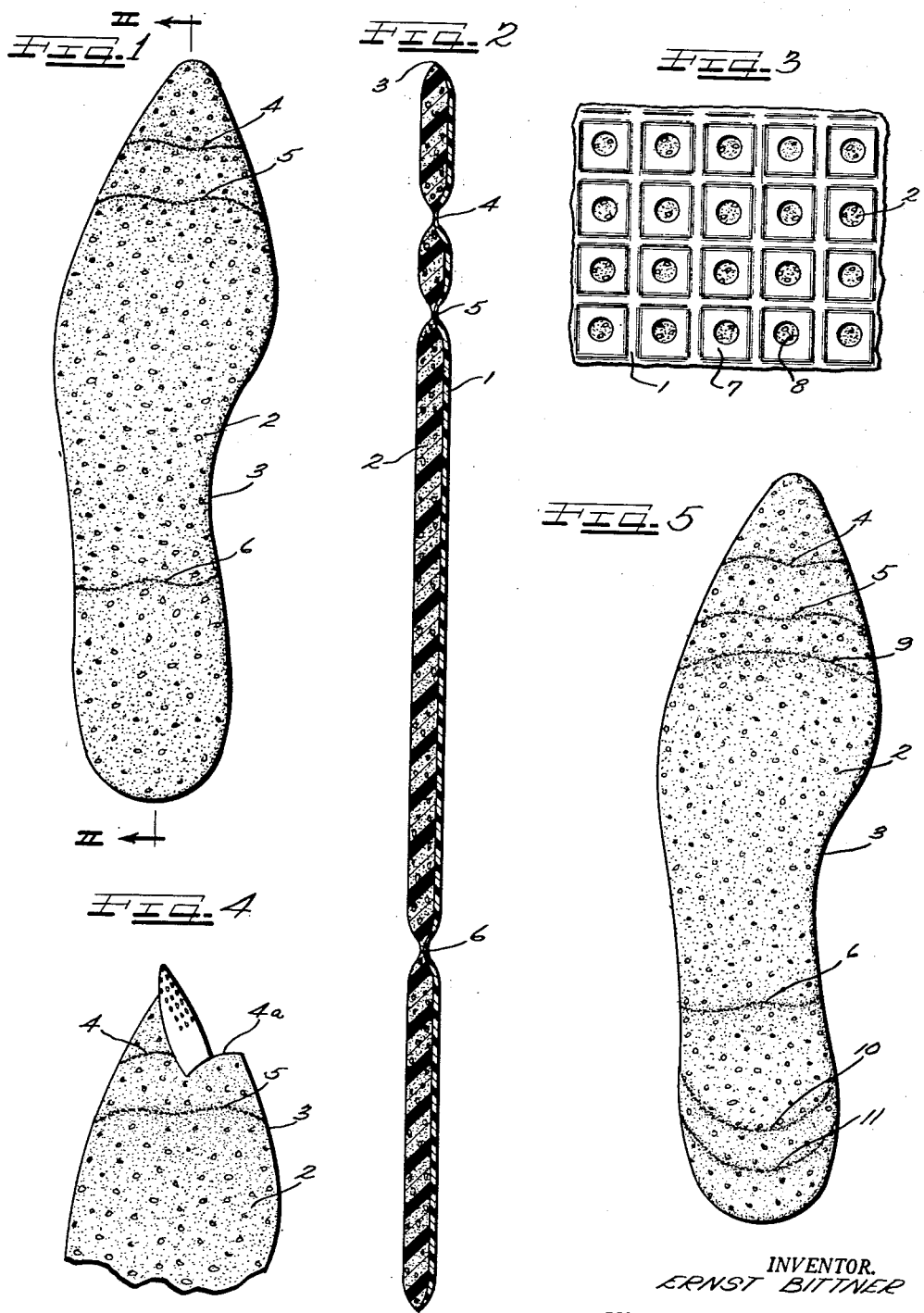
INVENTOR.
ERNST BITTNER
BY
ATTORNEYS

3,143,812
INSOLES FOR FOOTWEAR
Ernst Bittner, Frankfurt am Main, Germany, assignor to The Scholl Mfg. Co., Inc., Chicago, Ill., a corporation of New York
Filed Sept. 22, 1961, Ser. No. 139,961
Claims priority, application Germany Mar. 11, 1961
2 Claims. (Cl. 36—44)

This invention relates to improvements in insoles for footwear, and more particularly to insoles of the type freely disposed within articles of footwear to cushion or support the feet of the user for relieving tired feet, alleviating calluses on the plantar surface of the foot and discouraging growth of the same, and for miscellaneous other purposes, as will be well understood by those skilled in the art.

In the past, it has become desirable for numerous reasons to manufacture cushion type insoles of layers of thermoplastic material electronically heat sealed or welded together around the bounding edge of an insole. Where the cover layer and the cushioning layer therebeneath were only secured by such a heat seal seam around the bounding edge and otherwise left free of securement, which is desirable to avoid wrinkling and creasing of the insole during use, an insole would have to be manufactured of a proper shape and size for the size and style of an individual shoe or the like. Thus, an insole made for a lady's sharp pointed shoe would not fit in a shorter toeless shoe or in a shorter shoe having a broader tip, and if such insoles as heretofore made were sized by cutting off a portion of the tip, heel, or other part, there would be no line of jointure between the layers transversely of the insole where the same was cut. With the layers unsecured transversely of the insole at the forward or rear end thereof after so sizing the same, the appearance of the insole is detracted from, but if the insole is frequently changed from shoe to shoe, the separation between the layers is encouraged so that if not only is more difficult to properly position the trimmed insole within a shoe, but dirt, small stones, debris and the like can enter between the layers impairing the use of the insole and causing discomfort to the wearer.

With the foregoing in mind, it is an important object of the instant invention to provide an insole comprising thermoplastic layers or sheets heat sealed together in such a manner that the insole may readily be sized in accordance with a particular foot or a particular article of footwear.

Another object of this invention is the provision of an insole for an article of footwear, which insole comprises a plurality of sheets of thermoplastic material joined by a heat seal seam, and having a plurality of substantially transverse heat seal seams thereacross which function as tear lines for adjusting the size of the insole when desired.

It is also an object of this invention to provide a cushion type insole for articles of footwear, so arranged that by simply tearing off portions of the insole, a person, either a salesperson or the user, may lessen the size of the insole to fit several sizes and shapes of footwear, or reduce the insole to a ½ or ¾ insole, the adjustment being made at either or both ends of the insole.

Still a further feature of this invention resides in the provision of a cushion type insole including a cover piece of thermoplastic film or sheet, and a thicker sheet of thermoplastic foam cushioning material, the sheets being heat sealed or welded together around the bounding edge of the device, and the insole having a plurality of spaced substantially transversely disposed heat seal seams which may function each as a tear seam for removing a portion of the insole, leaving the sheets bound together entirely therearound after any transverse heat seal seam has been torn or cut through.

While some of the more salient features, characteristics and advantages of the instant invention have been above pointed out, others will become apparent from the following disclosures, taken in conjunction with the accompanying drawing, in which:

FIGURE 1 is a bottom plan view of an insole embodying principles of the instant invention;

FIGURE 2 is an enlarged longitudinal vertical sectional view through the insole, taken substantially as indicated by the line II—II of FIGURE 1, looking in the direction of the arrows;

FIGURE 3 is a fragmentary magnified view taken from the opposite side of the insole to illustrate the configuration of the cover member;

FIGURE 4 is a fragmentary bottom plan view illustrating the removal of a portion of the insole; and FIGURE 5 is a bottom plan view of an insole of slightly different construction but also embodying principles of this invention.

As shown on the drawings:

In the first illustrated embodiment of the instant invention, shown in FIGURES 1 to 4 inclusive, there is shown an insole for a lady's article of footwear, the illustrated insole being for use beneath the right foot. Obviously, an insole for the left foot will be allochiral to that illustrated, and equally as obviously men's insoles of the proper shape may be provided embodying principles of this invention.

The illustrated insole includes a cover layer 1 which is preferably a thermoplastic sheet or film such as a vinyl sheet or film. Beneath the cover layer 1 is a thicker sheet 2 of foam material, preferably thermoplastic foam such as a polyvinyl chloride foam, a polyurethane foam, or equivalent material. The foam layer has intercommunicating cells therein so that air is pumped through the layer during successive applications and releases of pressure during walking by the user, whereby the foot is adequately ventilated at all times.

The two layers 1 and 2 are joined together by a heat seal seam 3 defining the bounding edge of the insole. Such heat seal seam is a welding of the two layers together to a fine line seam and this may be accomplished by the use of a suitable die shaped to define the insole and utilized in an electronic heat sealing press. When such die is brought down upon layers of stock material of indefinite size, under pressure, and a quick charge of high frequency electric current passed through the die, both a heat and tear seal seam is established whereby the insole may readily be removed from the waste stock material.

At the same time the bounding seam 3 is established, a plurality of substantially transverse heat and tear seal seams are also provided in the insole. In this illustrated instance, there are two spaced seams 4 and 5 in the toe region of the insole, and a seam 6 just in front of the heel portion of the insole. The layers need not be otherwise connected together.

The illustrated insole is for a long tipped or pointed toe shoe, and therefore is too long for a broader tipped shoe of the same size or for an open toed shoe. However, should it be desired to utilize the illustrated insole in one such other shoe, it is a simple expedient to merely tear off the tip portion of the insole along the seam 4, no cutting implement being necessary for this purpose, although the same could be used if desired. The tearing off of the tip portion of the insole leaves the cover sheet 1 and the cushioned sheet 2 still bound together transversely where torn off, by the remainder of the heat seal seam as indicated at 4a in FIGURE 4. Should it be desired to adjust the insole for use in a broad and open toed article of footwear, it is a simple expedient to tear off the forward portion of the sole along the heat and tear seal seam 5 in the same manner. Should it not be desired to have a heel portion in the insole, so that it will be invisible in an open heeled shoe or for any other reason, it is a simple expedient to tear the insole transversely along the heat and tear seal 6 and remove the entire heel portion. It will thus be apparent that either the purchaser and user of the insole or a salesperson may readily adjust the insole for the desired article of footwear depending upon its size and shape, and the insole functions just as though no adjustment had been made and just as though it had been originally made in the desired shape and size.

In FIGURE 3 there is a magnified showing of the top face of the cover sheet 1. Preferably this sheet is embossed to perform relatively tiny squares 7 with an aperture 8 through the central portion of each of the squares. This type of embossing gives a very pleasing appearance, an excellent feel to the foot, and the apertures, of course, permit air to be pumped through the cover layer 1 from the foam layer 2 during use of the device. Obviously other patterns of embossing might be utilized on the cover sheet 1 and such embossing provides a softer "feel" and more intimate contact with the foot of the user, while still not interfering with easy insertion of the foot into an article of footwear over the insole.

In FIGURE 5 I have illustrated the same type of insole but with more transverse seams thereacross. Thus, with the insole in FIGURE 5 only one size insole need be manufactured for a range of sizes of footwear, since in this instance there is an added seam 9 to the rear of the aforesaid seam 5, and two added seams 10 and 11 in the heel portion of the device. Obviously, if so desired more seams could be added where desired. However with the structure shown in FIGURE 5, it is a simple expedient to tear off a portion of the toe or a part of the heel to enable the device to fit an article of footwear and the insole may be reduced along the seam 9 to function as a ¾ insole, the heel portion may be removed along the seam 6, and many and various adjustments so made in order to properly dispose the insole in the manner desired within an article of footwear. Such insoles, for example, would be extremely valuable for use in climbing shoes which have an extremely broad and blunt toe and must fit the foot more accurately and precisely than shoes commonly worn. The insole could well be adjusted for shoes of that character.

From the foregoing, it is apparent that I have provided a cushion type insole for an article of footwear, which provides adequate ventilation to the foot, provides an easy and soft comfortable feel to the foot, and in which the parts or layers need not be secured to each other except at spaced transverse lines and at the bounding edge, and yet the insole may be adjusted to provide a ½ or ¾ insole or in accordance with the size and shape of a particular article of footwear desired to be worn. The provision of the added transverse heat and tear seal seams adds but negligibly to the cost of manufacture since such operations are performed simultaneously with the formation of the insole. It will also be noted that the insole is pleasing in appearance, long lived and economical to manufacture, and may be laundered whenever desired.

It will be understood and modifications and variations may be effected without departing from the scope of the novel concepts of the present invention.

I claim as my invention:

1. In a full insole for articles of footwear, a thermoplastic cover sheet, a thicker sheet of thermoplastic foam material of equal area as and underlying said cover sheet, a heat seal seam joining said sheets around the bounding edge of the insole, said insole having a long pointed toe portion, a pair of spaced heat and tear seal seams extending substantially transversely across the toe portion of the insole and joining said sheets, and a transverse heat and tear seal seam joining said sheets forward of the heel portion, said tear seal seams functional as tear lines, whereby said full insole may be reduced in size as desired by tearing off a portion thereof along any transverse tear seam line without breaking the union between said sheets along that seam.

2. In an insole for articles of footwear, a thermoplastic cover sheet and a thermoplastic cushion sheet of equal area underlying said cover sheet, a heat seal seam bonding together said sheets around the bounding edge of the insole, and a plurality of spaced heat and tear seal seams functioning as tear lines and joining said sheets inside the first said heat seal seam and along any of which the insole may be torn apart without disrupting the union between the sheets to size the insole to a particular foot.

References Cited in the file of this patent

UNITED STATES PATENTS

| | | |
|---|---|---|
| 1,144,291 | Boyer | June 22, 1915 |
| 1,815,843 | Higdem | July 21, 1931 |
| 2,675,633 | Gaynor | Apr. 20, 1954 |
| 2,772,196 | Pooley | Nov. 27, 1956 |
| 2,979,835 | Scholl | Apr. 18, 1961 |

FOREIGN PATENTS

| | | |
|---|---|---|
| 856,622 | Great Britain | Dec. 21, 1960 |